United States Patent
Li et al.

(10) Patent No.: US 10,841,135 B2
(45) Date of Patent: Nov. 17, 2020

(54) TARGET CONSTELLATION DIAGRAM DETERMINING METHOD, DATA SENDING METHOD, AND APPARATUS

(71) Applicant: HUAWEI TECHNOLOGIES CO., LTD., Shenzhen (CN)

(72) Inventors: Mo Li, Chengdu (CN); Nebojsa Stojanovic, Munich (DE); Velimir Ilic, Darmstadt (DE); Ivan B. Djordjevic, Darmstadt (DE); Franko Kueppers, Darmstadt (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/274,209

(22) Filed: Feb. 12, 2019

(65) Prior Publication Data

US 2019/0182080 A1    Jun. 13, 2019

Related U.S. Application Data

(63) Continuation of application No. PCT/CN2016/095349, filed on Aug. 15, 2016.

(51) Int. Cl.
*H04L 25/03* (2006.01)
*H04L 27/34* (2006.01)
(Continued)

(52) U.S. Cl.
CPC ... *H04L 25/03235* (2013.01); *H04B 10/0779* (2013.01); *H04B 10/516* (2013.01);
(Continued)

(58) Field of Classification Search
CPC ........... H04L 25/03235; H04L 27/3836; H04L 27/3472; H04L 25/03292;
(Continued)

(56) References Cited

U.S. PATENT DOCUMENTS

2002/0154247 A1    10/2002   Ghosh et al.
2005/0237971 A1    10/2005   Skraparlis
(Continued)

FOREIGN PATENT DOCUMENTS

CN       1463525 A       12/2003
CN     101102301 A        1/2008
(Continued)

OTHER PUBLICATIONS

Ilic Velimir et al: "Optimal signal constellation design for nonlinear chromatic dispersion optical channel", 2015 12th International Conference on Telecommunication in Modern Satellite, Cable and Broadcasting Services (TELSIKS), IEEE, Oct. 14, 2015, pp. 129-132, XP032832907.
(Continued)

*Primary Examiner* — Sam K Ahn
*Assistant Examiner* — Amneet Singh
(74) *Attorney, Agent, or Firm* — Kilpatrick Townsend & Stockton LLP

(57) ABSTRACT

A target constellation diagram determining method, a data sending method, and an apparatus are provided in accordance with the disclosure. The target constellation diagram determining method in accordance with the disclosure may include receiving, by a receiving device, training data that is generated and sent by a sending device based on each constellation point in an alternative constellation diagram. A detection region of each constellation point can then be determined based on a position of the training data in the alternative constellation diagram. A cumulative distance corresponding to the alternative constellation diagram can be obtained based on a distance between the detection regions of the constellation points. The method may include determining, based on cumulative distances corresponding to a plurality of alternative constellation diagrams, that an
(Continued)

alternative constellation diagram with a largest cumulative distance is a target constellation diagram, and notifying the sending device of the target constellation diagram, so that the sending device modulates to-be-sent data based on the target constellation diagram.

12 Claims, 10 Drawing Sheets

(51) Int. Cl.
*H04B 10/61* (2013.01)
*H04B 10/69* (2013.01)
*H04B 10/077* (2013.01)
*H04L 27/38* (2006.01)
*H04B 10/516* (2013.01)

(52) U.S. Cl.
CPC .......... *H04B 10/616* (2013.01); *H04B 10/69* (2013.01); *H04L 25/03292* (2013.01); *H04L 27/3472* (2013.01); *H04L 27/3836* (2013.01); *H04L 2025/0377* (2013.01)

(58) Field of Classification Search
CPC .......... H04L 2025/0377; H04B 10/516; H04B 10/0779; H04B 10/69; H04B 10/616
See application file for complete search history.

(56) References Cited

U.S. PATENT DOCUMENTS

| 2007/0047678 | A1 | 3/2007 | Sibecas et al. |
| 2007/0230324 | A1* | 10/2007 | Li .................... H04W 72/0406 370/204 |
| 2011/0051851 | A1 | 3/2011 | Khayrallah |
| 2012/0327846 | A1 | 12/2012 | Wu |
| 2013/0091398 | A1 | 4/2013 | Djordjevic et al. |
| 2013/0336649 | A1 | 12/2013 | Essiambre et al. |
| 2014/0153672 | A1 | 6/2014 | Zhao et al. |

FOREIGN PATENT DOCUMENTS

| CN | 101253654 A | 8/2008 |
| CN | 101340412 A | 1/2009 |
| CN | 102447667 A | 5/2012 |
| CN | 104158633 A | 11/2014 |
| CN | 104682996 A | 6/2015 |
| CN | 104702557 A | 6/2015 |
| CN | 105656604 A | 6/2016 |
| CN | 105704073 A | 6/2016 |
| WO | 2015120891 A1 | 8/2015 |

OTHER PUBLICATIONS

A. Lau and J. Kahn, "Signal design and detection in presence of nonlinear phase noise," Lightwave Technology, Journal of, vol. 25, No. 10, pp. 3008-3016, Oct. 7.

* cited by examiner

TARGET CONSTELLATION DIAGRAM DETERMINING METHOD, DATA SENDING METHOD, AND APPARATUS

CROSS-REFERENCE TO RELATED APPLICATIONS

This application is a continuation of International Application No. PCT/CN2016/095349, filed on Aug. 15, 2016, the disclosure of which is hereby incorporated by reference in its entirety.

TECHNICAL FIELD

This application relates to the field of communications technologies, and in particular, to a target constellation diagram determining method, a data sending method, and an apparatus.

BACKGROUND

In a long-haul coherent optical transmission system, to-be-transmitted data is carried on both an amplitude and a phase of an optical signal. During transmission, quality of the optical signal becomes poor due to impact of light noise and optical fiber nonlinearity, degrading transmission performance. Self-phase modulation (SPM) and cross-phase modulation (XPM) are two nonlinear effects that most greatly affect the transmission performance.

In an optical transmission system, an incident optical power is usually expected to be increased as much as possible to increase an optical signal-to-noise ratio (OSNR) of an optical signal, thereby improving transmission performance of the signal and increasing a transmission distance of the signal. However, as the incident optical power is increased, nonlinear phase noise that accumulates with the transmission distance and that is caused by the SPM and XPM effects is also increased. Under impact of the highly nonlinear effects, a constellation diagram transmitted by a transmit device presents a distribution status that is different from that in a lowly nonlinear effect on a side of a receiving device. Because existing data sending, receiving, and detection methods are designed for a lowly nonlinear effect, working performance of the methods is very poor in a highly nonlinear effect.

In conclusion, currently, a target constellation diagram determining method for sending data and a data sending method are urgently needed, to improve transmission performance in a highly nonlinear effect.

SUMMARY

Embodiments of this application provide a target constellation diagram determining method, a data sending method, and an apparatus, to improve data transmission performance in a highly nonlinear effect.

An embodiment of this application provides a target constellation diagram determining method, including:
    determining, by a receiving device for received training data that is generated and sent by a sending device based on each of a plurality of alternative constellation diagrams in an alternative constellation diagram set, a detection region of each constellation point in the alternative constellation diagram based on a position of the training data in the alternative constellation diagram; and obtaining a cumulative distance corresponding to the alternative constellation diagram based on a distance between the detection regions of the constellation points; and
    after obtaining cumulative distances corresponding to the alternative constellation diagrams in the alternative constellation diagram set, determining, by the receiving device, that an alternative constellation diagram with a largest cumulative distance is a target constellation diagram, and sending a notification message to the sending device, where the notification message is used to notify the sending device of the target constellation diagram, so that the sending device modulates to-be-sent data based on the target constellation diagram.

In this way, in this embodiment of this application, the training data received by the receiving device can accurately reflect a signal distribution status under impact of a highly nonlinear effect. Therefore, the detection region of the constellation point in the alternative constellation diagram that is determined based on the training data is more accurate and conforms to an actual situation. In addition, the cumulative distance corresponding to the alternative constellation diagram is obtained based on the distance between the detection regions of the constellation points in the alternative constellation diagram. The distance between the detection regions fully reflects a centralized distribution status of data received by the receiving device after the data is sent by using the alternative constellation diagram. More centralized distribution of the received data indicates a larger distance between the detection regions and better data transmission performance. Therefore, in this embodiment of this application, the target constellation diagram is determined based on the cumulative distance that can accurately reflect the distance between the detection regions of the constellation points in the alternative constellation diagram, and the data is sent by using the determined target constellation diagram, so that the data transmission performance can be effectively improved in the highly nonlinear effect.

An embodiment of the present invention provides a data sending method, including:
    generating, by a sending device, training data based on a plurality of alternative constellation diagrams in an alternative constellation diagram set, and sending the training data to a receiving device, so that the receiving device determines a target constellation diagram in the plurality of alternative constellation diagrams based on the training data of the plurality of alternative constellation diagrams;
    receiving, by the sending device, a notification message sent by the receiving device, where the notification message is used to notify the sending device of the target constellation diagram; and
    modulating, by the sending device, the to-be-sent data based on the target constellation diagram, and sending the data to the receiving device.

In this way, the sending device generates and sends the training data based on the alternative constellation diagrams, to provide an effective data source to the receiving device for determining the target constellation diagram. The sending device sends the data based on the target constellation diagram, and the receiving device detects the data based on the detection regions in the target constellation diagram, so that data transmission performance can be effectively improved.

In this way, the sending device sends the training data in the foregoing manner, so that the receiving device may separately process the training data generated for the constellation points, thereby avoiding interference between the training data generated for the different constellation points, so that obtained valid training data is more accurate.

An embodiment of this application provides a receiving device, including a transceiver module and a processing module, where the transceiver module is configured to receive training data that is generated and sent by a sending device based on each of a plurality of alternative constellation diagrams in an alternative constellation diagram set; and the processing module is configured to: for the received training data that is generated and sent by the sending device based on each of the plurality of alternative constellation diagrams in the alternative constellation diagram set, determine a detection region of each constellation point in the alternative constellation diagram based on a position of the training data in the alternative constellation diagram; obtain a cumulative distance corresponding to the alternative constellation diagram based on a distance between the detection regions of the constellation points; and after obtaining cumulative distances corresponding to the alternative constellation diagrams in the alternative constellation diagram set, determine that an alternative constellation diagram with a largest cumulative distance is a target constellation diagram, and send a notification message to the sending device by using the transceiver module, where the notification message is used to notify the sending device of the target constellation diagram, so that the sending device modulates to-be-sent data based on the target constellation diagram.

An embodiment of this application provides a sending device, including a transceiver module and a processing module, where the processing module is configured to: generate training data based on a plurality of alternative constellation diagrams in an alternative constellation diagram set, and send the training data to a receiving device, so that the receiving device determines a target constellation diagram in the plurality of alternative constellation diagrams based on the training data of the plurality of alternative constellation diagrams;

the transceiver module is configured to receive a notification message sent by the receiving device, where the notification message is used to notify the sending device of the target constellation diagram; and the processing module is further configured to: modulate the to-be-sent data based on the target constellation diagram, and send the data to the receiving device by using the transceiver module.

An embodiment of this application provides another receiving device, including a communications interface and a processor, where the communications interface is configured to receive training data that is generated and sent by a sending device based on each of a plurality of alternative constellation diagrams in an alternative constellation diagram set; and the processor is configured to: for the received training data that is generated and sent by the sending device based on each of the plurality of alternative constellation diagrams in the alternative constellation diagram set, determine a detection region of each constellation point in the alternative constellation diagram based on a position of the training data in the alternative constellation diagram; obtain a cumulative distance corresponding to the alternative constellation diagram based on a distance between the detection regions of the constellation points; and after obtaining cumulative distances corresponding to the alternative constellation diagrams in the alternative constellation diagram set, determine that an alternative constellation diagram with a largest cumulative distance is a target constellation diagram, and send a notification message to the sending device by using the communications interface, where the notification message is used to notify the sending device of the target constellation diagram, so that the sending device modulates to-be-sent data based on the target constellation diagram.

An embodiment of this application provides a sending device, including a communications interface and a processor, where the processor is configured to: generate training data based on a plurality of alternative constellation diagrams in an alternative constellation diagram set, and send the training data to a receiving device, so that the receiving device determines a target constellation diagram in the plurality of alternative constellation diagrams based on the training data of the plurality of alternative constellation diagrams;

the communications interface is configured to receive a notification message sent by the receiving device, where the notification message is used to notify the sending device of the target constellation diagram; and the processor is further configured to: modulate the to-be-sent data based on the target constellation diagram, and send the data to the receiving device by using the communications interface.

In the foregoing embodiments of this application, the receiving device receives the training data that is generated and sent by the sending device based on each constellation point in the alternative constellation diagram; the receiving device determines the detection region of the constellation point based on the position of the training data corresponding to the constellation point in the alternative constellation diagram; the receiving device obtains the cumulative distance corresponding to the alternative constellation diagram based on the distance between the detection regions of the constellation points; the receiving device determines, based on the cumulative distances corresponding to the plurality of alternative constellation diagrams, the alternative constellation diagram with the largest cumulative distance as the target constellation diagram, and sends the notification message to the sending device, where the notification message is used to notify the sending device of the target constellation diagram, so that the sending device modulates the to-be-sent data based on the target constellation diagram. In the embodiments of this application, the training data received by the receiving device can accurately reflect a signal distribution status under impact of a highly nonlinear effect. Therefore, the detection region of the constellation point in the alternative constellation diagram that is determined based on the training data is more accurate and conforms to an actual situation. In addition, the cumulative distance corresponding to the alternative constellation diagram is obtained based on the distance between the detection regions of the constellation points in the alternative constellation diagram. The distance between the detection regions fully reflects a centralized distribution status of data received by the receiving device after the data is sent by using the alternative constellation diagram. More centralized distribution of the received data indicates a larger distance between the detection regions and better data transmission performance. Therefore, in the embodiments of this application, the target constellation diagram is determined based on the cumulative distance that can accurately reflect the distance between the detection regions of the constellation points in the alternative constellation diagram, and the data is sent by using the determined target constellation diagram, so that the data transmission performance can be effectively improved in the highly nonlinear effect.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and persons of ordinary skill in the art may still derive other drawings from these accompanying drawings without creative efforts.

DESCRIPTION OF EMBODIMENTS

Figure 1A:
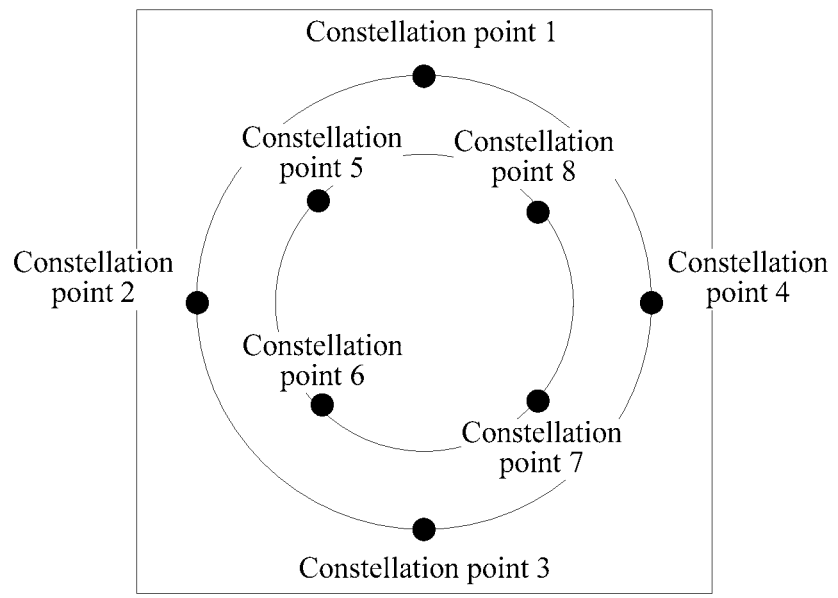
FIG. 1a is a schematic diagram of a constellation diagram including eight constellation points according to an embodiment of this application.

To make the objectives, technical solutions, and advantages of this application clearer, the following further describes this application in detail with reference to the accompanying drawings. Apparently, the described embodiments are merely a part rather than all of the embodiments of this application. All other embodiments obtained by persons of ordinary skill in the art based on the embodiments of this application without creative efforts shall fall within the protection scope of this application.

A frequency band occupied by a signal (baseband signal) that actually needs to be transmitted usually starts from a low frequency, but an actual communication channel is always band-pass. Therefore, to implement communication in this situation, a signal including information needs to be modulated, to be suitable for transmission of an actual channel. Modulating a signal by using a constellation diagram is a frequently-used digital modulation technology. In a process of the digital modulation technology, a bit sequence carrying digital information is mapped into a symbol sequence suitable for transmission. The constellation diagram represents a set including all values of an output symbol, and each constellation point in the constellation diagram corresponds to a value of the output symbol.

A process of data transmission is: A transmit end modulates and sends data by using a pre-designed constellation diagram, and a receive end detects the data after receiving the data sent by a sending device, thereby demodulating the data.

To achieve good transmission performance, in the prior art, a constellation diagram design method (the transmit end) based on a Min-TS-SER (minimum two-stage symbol error rate) algorithm is provided, and in coordination with a two-stage detector (the receive end), data is transmitted. Specifically, in the Min-TS-SER algorithm, a constellation diagram for sending data is determined by using a criterion in which a smallest symbol error rate is obtained when the receive end uses the two-stage detector. Subsequently, the transmit end modulates and sends the data by using the constellation diagram. After receiving the data sent by the transmitting end, the receive end detects the data by using the two-stage detector. The two-stage detector divides a signal plane into N sub-regions, a value of N is a quantity of constellation points in the constellation diagram used by the transmit end, and each sub-region is a detection region corresponding to each constellation point. When a received signal point falls in the detection region of the constellation point, the two-stage detector determines that the data sent by the transmit end is modulated onto the constellation point. In a lowly nonlinear scenario (for example, in a short-distance fiber-optic cable with a relatively low incident optical power), because a nonlinear effect is relatively small, for each constellation point on which the data sent by the transmit end is modulated, signal points are clustered in the detection region corresponding to the constellation point after the receive end receives the data, so that the data can be accurately demodulated by using the foregoing method, and transmission performance of the data is relatively good.

Figure 1B:
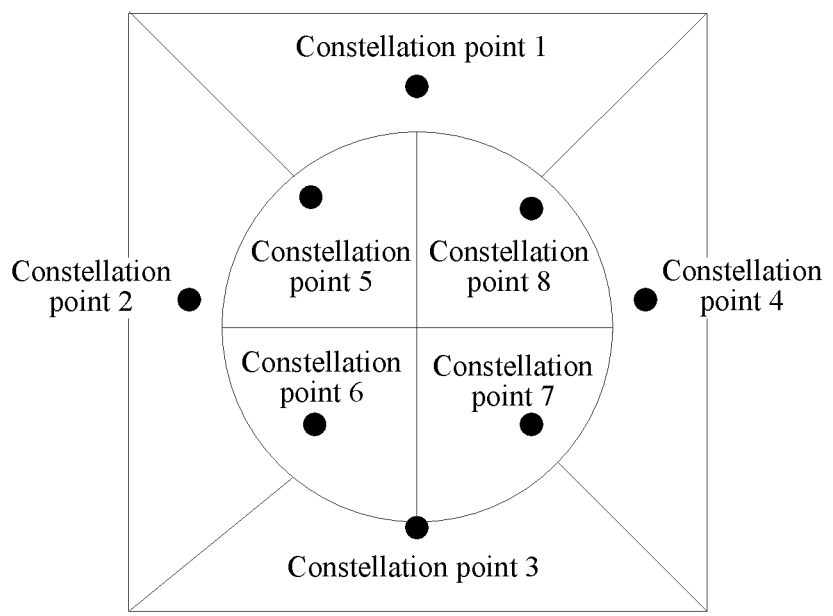
FIG. 1b is a schematic diagram of a signal plane divided by a two-stage detector.
Figure 1C:
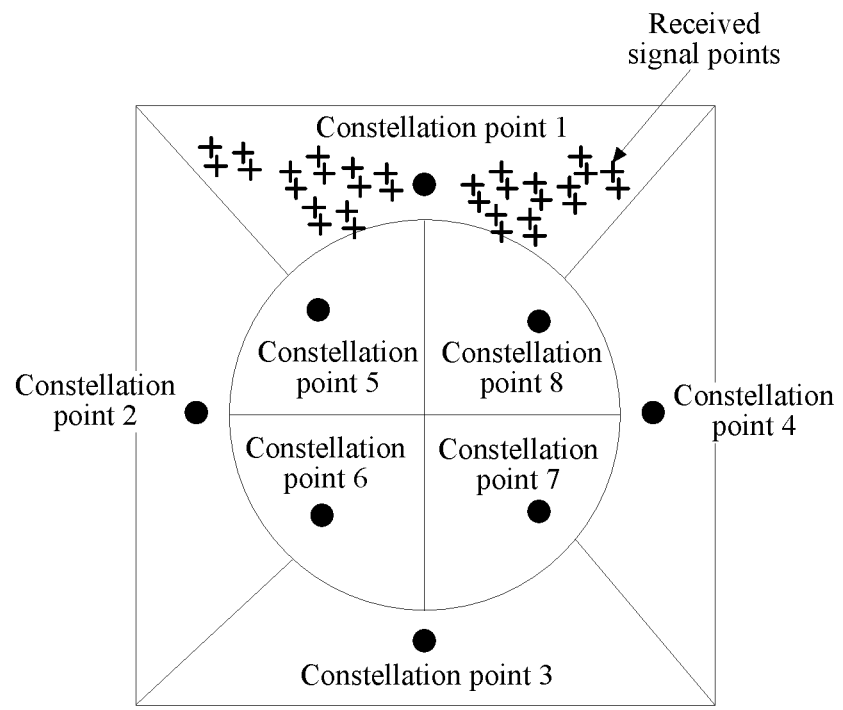
FIG. 1c is a schematic diagram of a clustering result of signal points received by a receive end in a lowly nonlinear scenario.

For example, FIG. 1a shows the constellation diagram determined by using the Min-TS-SER algorithm, which includes eight constellation points: a constellation point 1, a constellation point 2, a constellation point 3, a constellation point 4, a constellation point 5, a constellation point 6, a constellation point 7, and a constellation point 8. Correspondingly, FIG. 1b is a schematic diagram of the signal plane divided by the two-stage detector. As shown in FIG. 1b, the two-stage detector divides the signal plane into eight sub-regions, which are detection regions corresponding to the constellation point 1, the constellation point 2, the constellation point 3, the constellation point 4, the constellation point 5, the constellation point 6, the constellation point 7, and the constellation point 8. FIG. 1c shows a clustering result of signal points received by the receive end after the transmit end sends a plurality of pieces of data that are modulated onto the constellation points 1 in a lowly nonlinear scenario. The signal points are centralized in the detection region corresponding to the constellation point 1, so that data can be accurately demodulated.

Figure 1D:
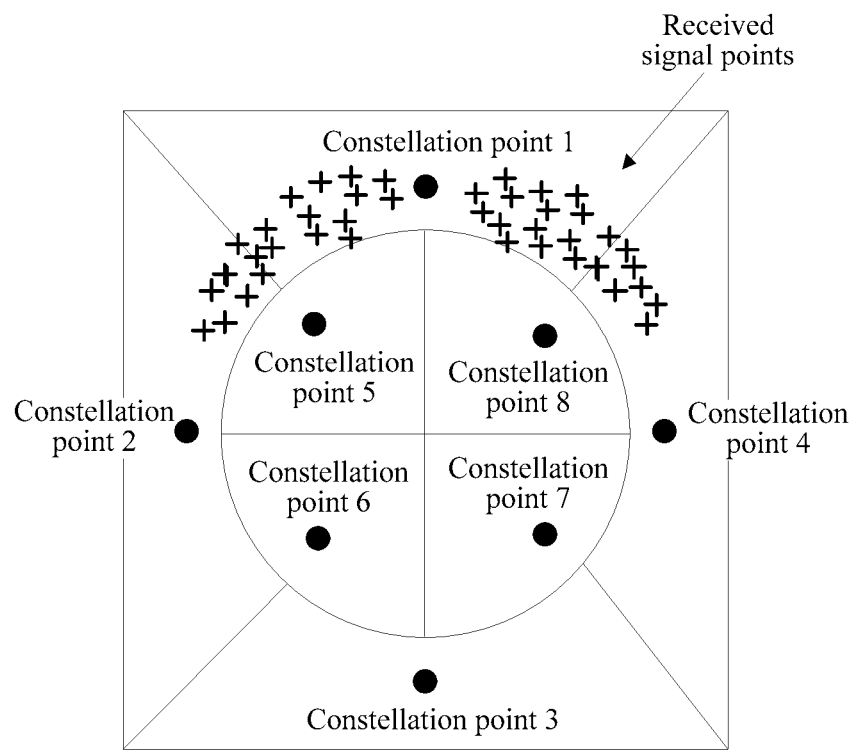
FIG. 1d is a schematic diagram of a clustering result of signal points received by a receive end in a highly nonlinear scenario.

However, in a highly nonlinear scenario (for example, a long-distance fiber-optic cable with a relatively high incident optical power), because nonlinear phase noise is relatively high, clustering of the signal points crosses detection regions of a plurality of constellation points that are divided by the two-stage detector. FIG. 1d is a schematic diagram of a clustering result of the signal points in the highly nonlinear scenario. As shown in FIG. 1d, for the plurality of pieces of data that are sent by the transmit end and that are modulated onto the constellation points 1 sent by the transmit end, clustering of the signal points received by the receive end crosses the detection regions corresponding to the constellation point 1, the constellation point 2, and the constellation point 4. Consequently, a large quantity of detection errors is caused, seriously affecting data transmission performance.

Based on the foregoing problem, the embodiments of this application provide a target constellation diagram determining method for sending data, a data sending method, and a data receiving method, to improve transmission performance in a highly nonlinear effect.

Figure 2:
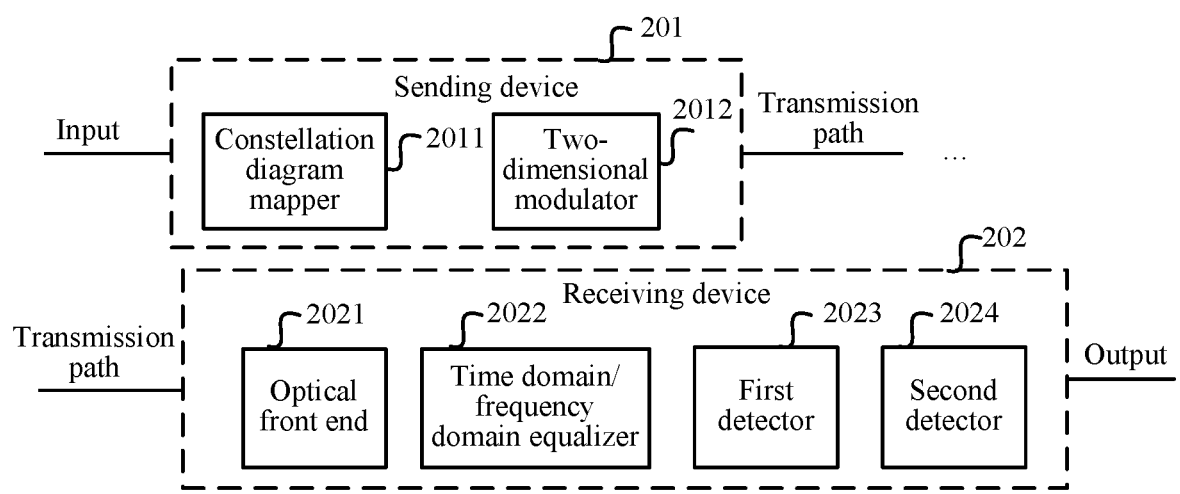
FIG. 2 is a schematic diagram of a system architecture to which an embodiment of this application is applicable.

The target constellation diagram determining method, the data sending method, and the data receiving method in the embodiments of this application may be applied to a plurality of system architectures. FIG. 2 is a schematic diagram of a system architecture to which an embodiment of this application is applicable. As shown in FIG. 2, the system architecture includes a sending device 201, a transmission path, and a receiving device 202. After modulating data by using a target constellation diagram determined in this embodiment of this application, the sending device 201 sends modulated data to the receiving device 202 by using the transmission path. The receiving device 202 demodulates the received modulated data based on a detection region of each constellation point in the target constellation diagram, thereby implementing effective transmission of the data.

As shown in FIG. 2, the sending device 201 may include a constellation diagram mapper 2011 and a two-dimensional modulator 2012. The receiving device 202 may include an optical front end 2021, a time domain/frequency domain equalizer 2022, a first detector 2023, and a second detector 2024.

Specifically, the constellation diagram mapper 2011 may be a maximum likelihood optimal constellation diagram (Most Likely optimal signal constellation, MLOSC for short) mapper, configured to map a bit stream into a two-dimensional symbol based on the target constellation diagram determined by using the target constellation diagram determining method in the embodiments of this application. The two-dimensional modulator 2012 is configured to modulate the two-dimensional symbol into an optical signal and send the optical signal to a fiber channel. The optical front end 2021 is configured to convert the received optical signal into an electrical signal. The time domain/frequency domain equalizer 2022 is configured to compensate dispersion and another effect in the fiber channel. The first detector 2023 may be a Monte Carlo maximum likelihood (Monte Carlo Most Likely detector, MCMLD for short) detector, configured to detect, based on the detection regions of the constellation points in the target constellation diagram, a symbol output by the time domain/frequency domain equalizer 2022. The second detector 2024 is configured to detect a remaining symbol that cannot be detected by the MCMLD detector, that is, detect a symbol outside the detection regions of the constellation points.

Figure 3:
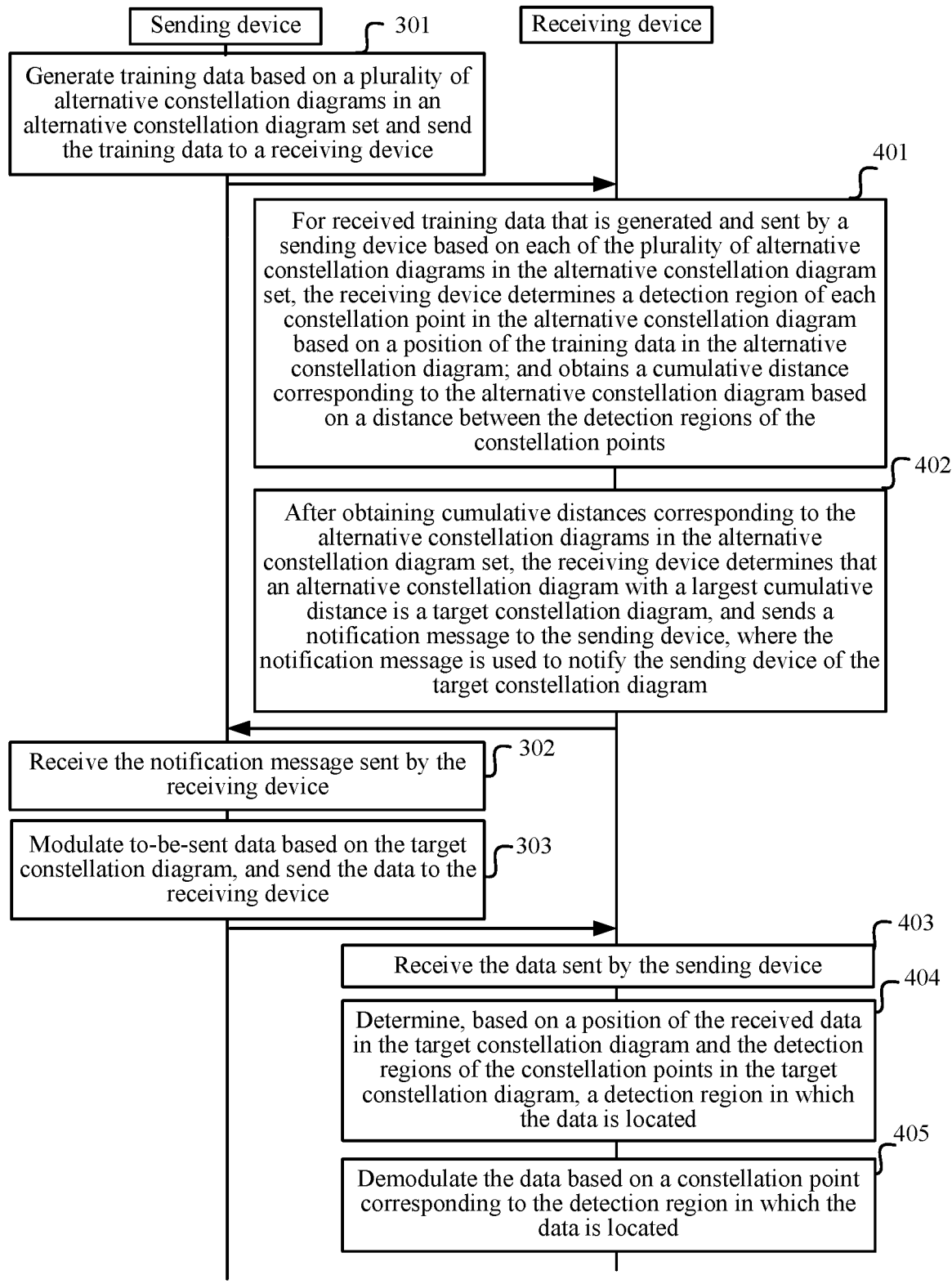
FIG. 3 is a schematic diagram of an overall procedure of data transmission according to Embodiment 1 of this application.

Based on the system architecture shown in FIG. 2, FIG. 3 is a schematic diagram of an overall procedure of data transmission according to Embodiment 1 of this application. As shown in FIG. 3, the following steps are included.

Step 301. The sending device generates training data based on a plurality of alternative constellation diagrams in an alternative constellation diagram set and send the training data to the receiving device.

Step 401. For received training data that is generated and sent by the sending device based on each of the plurality of alternative constellation diagrams in the alternative constellation diagram set, the receiving device determines a detection region of each constellation point in the alternative constellation diagram based on a position of the training data in the alternative constellation diagram, and obtains a cumulative distance corresponding to the alternative constellation diagram based on a distance between the detection regions of the constellation points.

Step 402. After obtaining cumulative distances corresponding to the alternative constellation diagrams in the alternative constellation diagram set, the receiving device determines that an alternative constellation diagram with a largest cumulative distance is a target constellation diagram, and sends a notification message to the sending device, where the notification message is used to notify the sending device of the target constellation diagram.

Step 302. The sending device receives the notification message sent by the receiving device.

Step 303. The sending device modulates the to-be-sent data based on the target constellation diagram, and sends the data to the receiving device.

Step 403. The receiving device receives data sent by the sending device, where the data is obtained after the sending device modulates the to-be-sent data based on the target constellation diagram.

Step 404. The receiving device determines, based on a position of the received data in the target constellation diagram and the detection regions of the constellation points in the target constellation diagram, a detection region in which the data is located.

Step 405. The receiving device demodulates the data based on a constellation point corresponding to the detection region in which the data is located.

In this embodiment of this application, the training data received by the receiving device can accurately reflect a signal distribution status under impact of a highly nonlinear effect. Therefore, the detection region of the constellation point in the alternative constellation diagram that is determined based on the training data is more accurate and conforms to an actual situation. In addition, the cumulative distance corresponding to the alternative constellation diagram is obtained based on the distance between the detection regions of the constellation points in the alternative constellation diagram. The distance between the detection regions fully reflects a centralized distribution status of data received by the receiving device after the data is sent by using the alternative constellation diagram. More centralized distribution of the received data indicates a larger distance between the detection regions and better data transmission performance. Therefore, in this embodiment of this application, the target constellation diagram is determined based on the cumulative distance that can accurately reflect the distance between the detection regions of the constellation points in the alternative constellation diagram, and the data is sent by using the determined target constellation diagram, so that the data transmission performance can be effectively improved in the highly nonlinear effect.

Step 301 to step 303 are a schematic flowchart of data sending in this embodiment of this application, step 401 and step 402 are a schematic flowchart of determining the target constellation diagram in this embodiment of this application, and step 403 to step 405 are a schematic flowchart of data receiving in this embodiment of this application.

Specifically, in step 301, the alternative constellation diagram set may be determined based on a preset rule. The preset rule may be set by persons skilled in the art based on experience. For example, a constellation diagram has eight constellation points, the preset rule may include the following conditions: (1) If a constellation point is at a center of the constellation diagram, the constellation point may be used as an innermost ring, and a maximum total quantity of rings 3, and otherwise, a maximum total quantity of rings is 2; (2) Quantities of constellation points included in outer two rings should be as close to each other as possible; (3) On each ring, a plurality of constellation points equally divides the ring.

In this embodiment of this application, after the alternative constellation diagram set is determined, the sending device may process the alternative constellation diagrams in a specified sequence. Specifically, the sending device may select an alternative constellation diagram from the alternative constellation diagram set in the specified sequence, generates training data based on the selected alternative constellation diagram, and sends the training data to the receiving device. There may be a plurality of manners, such as the following Manner 1 and Manner 2, in which the sending device generates training data based on the selected alternative constellation diagram and sends the training data to the receiving device.

Manner 1:

The sending device generates training data for each constellation point in the selected alternative constellation diagram, and separately sends the training data generated for the different constellation points in the selected alternative constellation diagram to the receiving device at preset intervals, so that the receiving device can separately determine detection regions of the different constellation points for the training data generated for the different constellation points. The preset interval may be set by persons skilled in the art based on experience. Specifically, the preset interval may be set based on a time required by the receiving device for determining a detection region based on received training data of a constellation point.

Figure 4A:
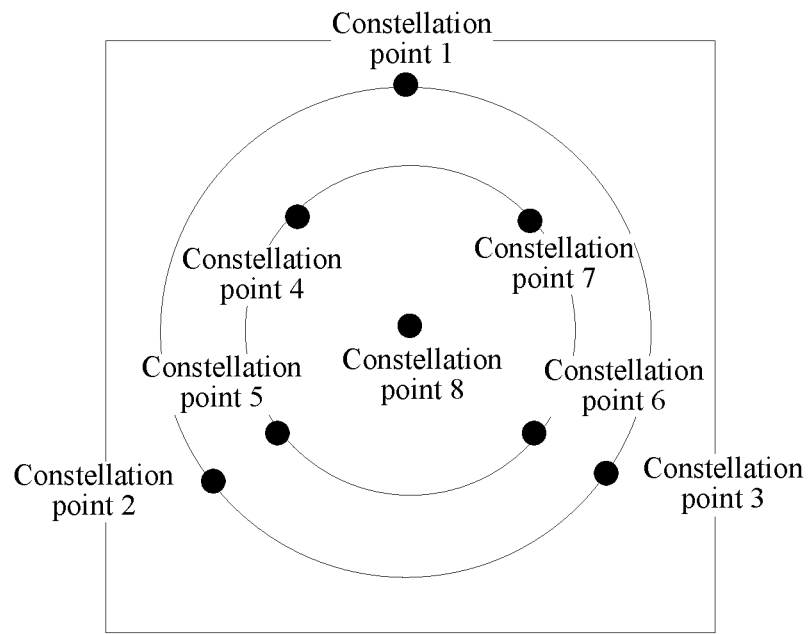
FIG. 4a is a schematic diagram of an alternative constellation diagram a according to an embodiment of this application.

For example, the sending device selects an alternative constellation diagram a. FIG. 4a is a schematic diagram of the alternative constellation diagram a. As shown in FIG. 4a, the alternative constellation diagram a has eight constellation points (which are respectively a constellation point 1, a constellation point 2, a constellation point 3, a constellation point 4, a constellation point 5, a constellation point 6, a constellation point 7, and a constellation point 8). The sending device may separately generate training data based on the eight constellation points, and may send the training data in a preset sequence, for example, first send the training data generated for the constellation point 1, send the training data generated for the constellation point 2 after the preset interval is reached, then send the training data generated for the constellation point 3 after the preset interval is reached again, and so on, finally send the training data generated for the constellation point 8 to the receiving device.

The foregoing process is merely an example. In a specific implementation process, the sending device may first generate the training data of the eight constellation points, and then send the training data at preset intervals. Alternatively, the sending device may generate training data of the constellation point 1 and send the training data, and during a process of sending the training data, the sending device may generate training data of the constellation point 2 for subsequent sending. A manner of generating the training data of the constellation points is not specifically limited in this embodiment of this application, provided that the training data generated for the constellation points is separately sent to the receiving device at the preset intervals.

Correspondingly, in step 401, after receiving the training data sent by the sending device in the foregoing manner, the receiving device may separately process the training data generated for the different constellation points. For a first constellation point (the first constellation point is any constellation point in the alternative constellation diagram) in the alternative constellation diagram, after receiving training data generated for the first constellation point, the receiving device may determine a detection region of the first constellation point in the following manner.

Figure 4B:
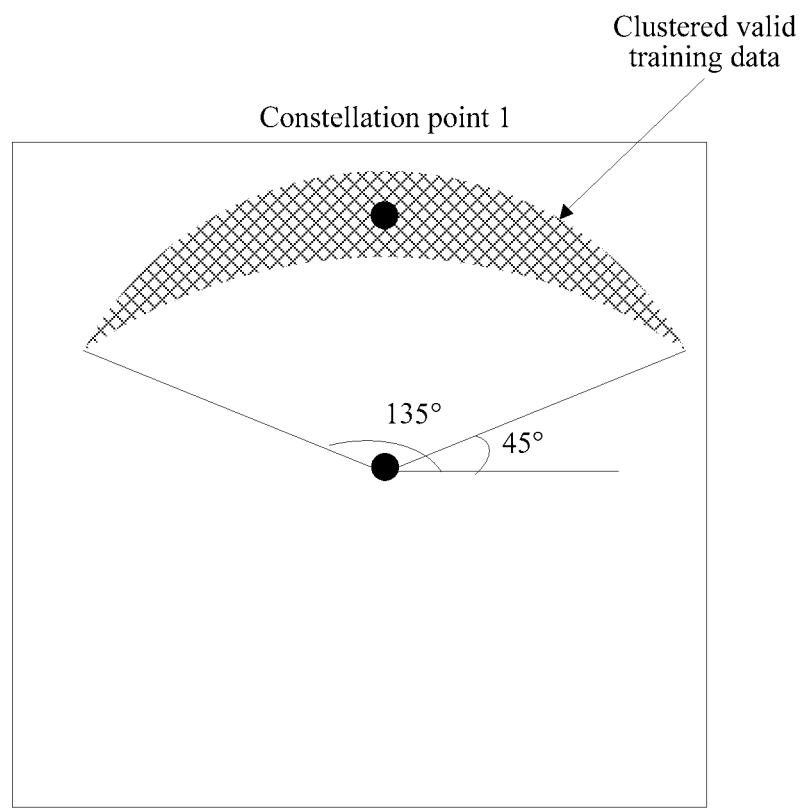
FIG. 4b is a schematic diagram of distribution of valid training data according to an embodiment of this application.

After receiving the training data that is generated for the first constellation point and that is sent by the sending device, the receiving device performs de-noising processing on the training data, to obtain valid training data. Specifically, the receiving device may perform de-noising processing by using a plurality of methods. In this embodiment of this application, preferably, the receiving device may perform clustering processing on the received training data by using a preset clustering algorithm, and remove, as noise, training data that cannot be clustered, to obtain the valid training data. Using an example in which the first constellation point is the constellation point 1, as shown in FIG. 4b, FIG. 4b is a schematic diagram of distribution of valid training data obtained in the foregoing manner. The preset clustering algorithm may be a DBSCAN (Density-Based Spatial Clustering of Applications with Noise) clustering algorithm. The DBSCAN clustering algorithm is a density-based scatter clustering algorithm, and may be applied to a situation in which a quantity of clustering categories is not known in advance.

In this embodiment of this application, if in the DBSCAN clustering algorithm, the training data generated for the first constellation point is clustered into a plurality of categories, after training data that cannot be clustered is removed, the plurality of categories may be combined into a large category, thereby facilitating subsequently determining the detection region of the first constellation point for the large category.

The receiving device determines, based on a position that is of the valid training data in the alternative constellation diagram a and that is shown in FIG. 4b, that a region that can fully cover the valid training data and that has a smallest area is the detection region of the first constellation point.

Figure 5:
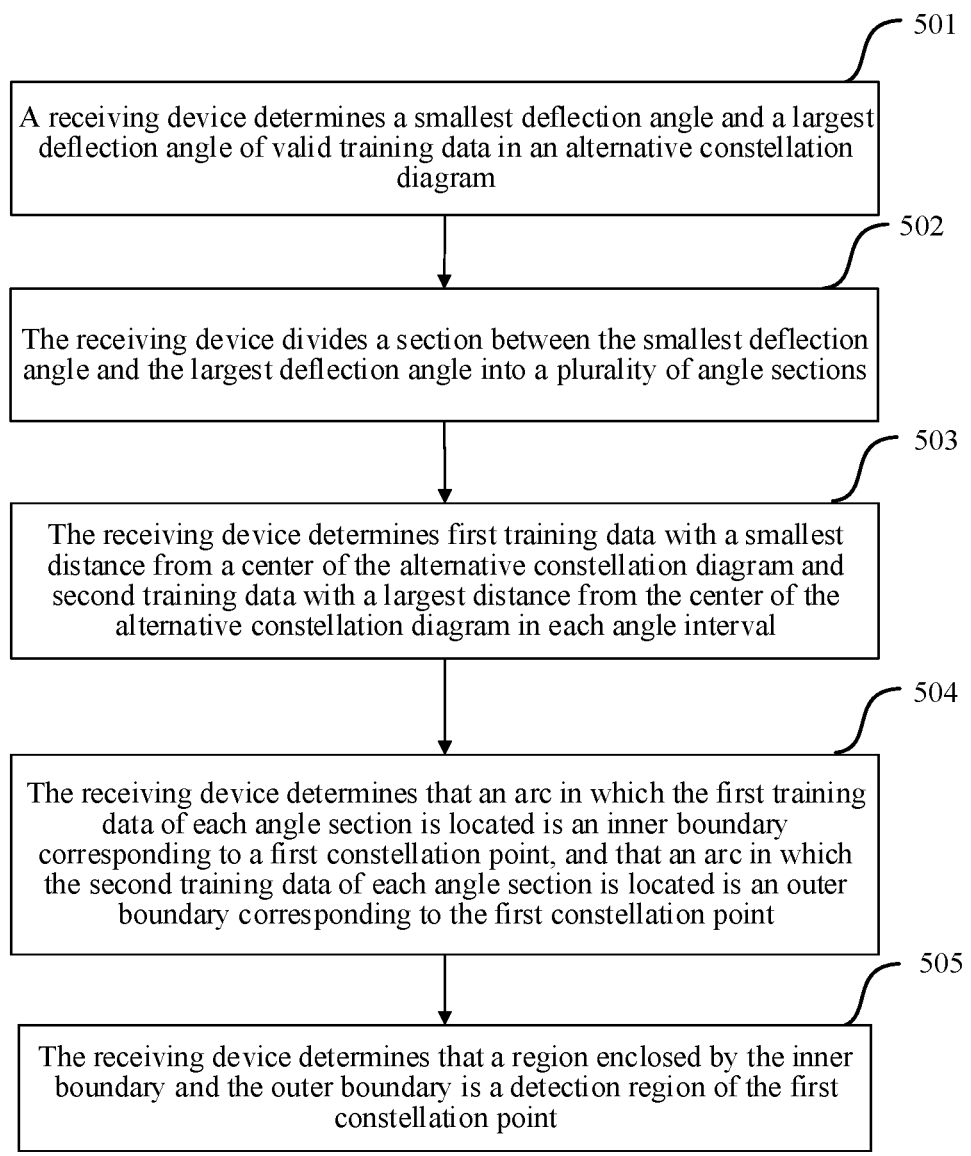
FIG. 5 is a schematic flowchart of determining a detection region of a first constellation point by a receiving device according to an embodiment of this application.

FIG. 5 is a schematic flowchart of determining the detection region of the first constellation point by the receiving device according to an embodiment of this application. The receiving device may determine the detection region of the first constellation point based on a procedure shown in FIG. 5. Specific descriptions are provided below with reference to FIG. 5. The procedure includes the following steps.

Step 501. The receiving device determines a smallest deflection angle and a largest deflection angle of the valid training data in the alternative constellation diagram. As shown in FIG. 4b, the receiving device determines that the smallest deflection angle of the valid training data in the alternative constellation diagram a is 45°, and the largest deflection angle is 135°.

Step 502. The receiving device divides a section between the smallest deflection angle and the largest deflection angle into a plurality of angle sections. Specifically, the receiving device may divide the angle section based on a micro step, and the micro step may be set by persons skilled in the art based on experience.

Step 503. The receiving device determines first training data with a smallest distance from a center of the alternative constellation diagram and second training data with a largest distance from the center of the alternative constellation diagram in each angle interval. The distance between the first training data and the center in the alternative constellation diagram is a smallest radius of the angle section, and the first training data may be a sample point on the smallest radius. The distance between the second training data and the center in the alternative constellation diagram is a largest radius of the angle section, and the second training data may be a sample point on the largest radius.

Step 504. The receiving device determines that an arc in which the first training data of each angle section is located is an inner boundary corresponding to the first constellation point, and that an arc in which the second training data of each angle section is located is an outer boundary corresponding to the first constellation point.

Figure 4C:
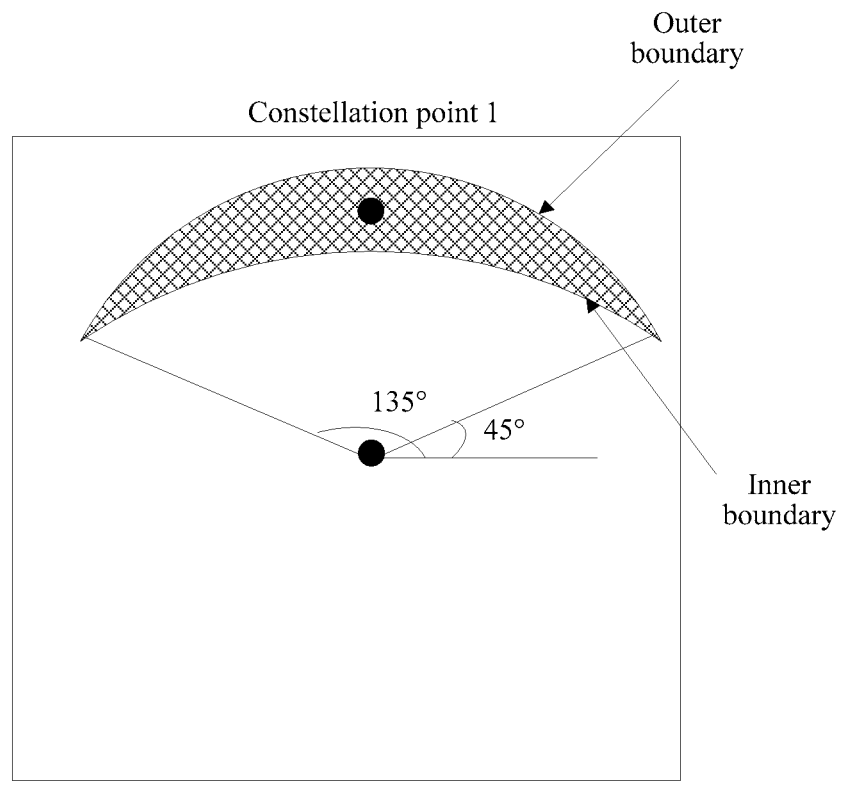
FIG. 4c is a schematic diagram of a detection region of a first constellation point according to an embodiment of this application.

Step 505. The receiving device determines that a region enclosed by the inner boundary and the outer boundary is the detection region of the first constellation point. As shown in FIG. 4c, FIG. 4c is a schematic diagram of the detection region of the first constellation point.

It should be noted that the foregoing FIG. 4b and FIG. 4c are merely examples for description, and the largest deflection angle, the smallest deflection angle, and a shape of the detection region, and the like are not intended to be limited.

In this embodiment of this application, after the sending device sends the training data in Manner 1, the receiving device may separately process the training data generated for the constellation points, thereby avoiding interference between the training data generated for the different constellation points, so that obtained valid training data is more accurate, thereby laying a good data foundation for subsequently determining the detection regions of the constellation points.

Further, the receiving device first performs the angle section division, and determines the first training data and the second training data for the angle sections, to obtain the inner boundary and the outer boundary corresponding to the first constellation point, thereby determining the detection region of the first constellation point. The manner of determining the inner boundary and the outer boundary based on a relatively small angle section has relatively high accuracy, so that the determined detection region of the first constellation point is relatively accurate.

Manner 2:

The sending device generates training data for each constellation point in the selected alternative constellation diagram, and simultaneously sends the training data to the receiving device, so that the receiving device can simultaneously perform subsequent processing on the training data generated for the different constellation points.

Correspondingly, in step 401, after receiving the training data sent by the sending device in the foregoing manner, the receiving device may simultaneously perform de-noising processing on the training data generated for the constellation points in the alternative constellation diagram, to obtain valid training data corresponding to the constellation points. Subsequently, the valid training data corresponding to the constellation points is processed by using the procedure in FIG. 5, to obtain the detection regions of the constellation points.

It can be learned from the foregoing content that after the sending device sends the training data in Manner 2, the receiving device may simultaneously process the training data generated for the constellation points in the alternative constellation diagram, so that a processing speed can be effectively increased, thereby reducing a processing time.

In this embodiment of this application, when determining the detection regions of the constellation points in the alternative constellation diagram, the receiving device needs to cluster, by using a clustering algorithm, the training data generated for the constellation points. When the sending device sends the training data in Manner 2, the receiving device simultaneously clusters the training data generated for the constellation points. If the training data generated for the constellation point is clustered into a plurality of categories, clustering clutter is caused. Consequently, accuracy of subsequent determining of the detection region is also affected. Therefore, in this embodiment of this application, the sending device preferably sends the training data in Manner 1. Certainly, when performance of a transmission path is relatively good or in another suitable situation, the sending device may alternatively send the training data in Manner 2.

Figure 4D:
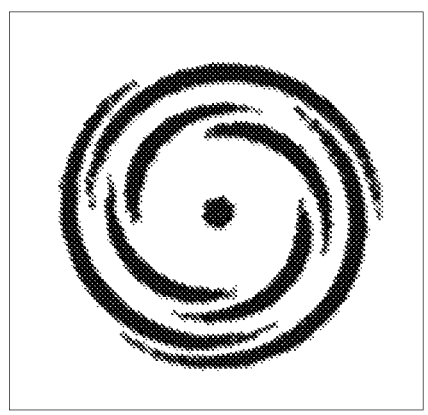
FIG. 4d is a schematic diagram of a detection region of each constellation point in an alternative constellation diagram determined by a receiving device according to an embodiment of this application.

FIG. 4d is a schematic diagram of the detection regions that are of the constellation points in the alternative constellation diagram a and that are determined by the receiving device according to an embodiment of this application. Helical regions in the figure are the detection regions of the constellation points. In step 401, the receiving device may determine the cumulative distance corresponding to the alternative constellation diagram based on the detection regions of the constellation points in the alternative constellation diagram.

Figure 6:
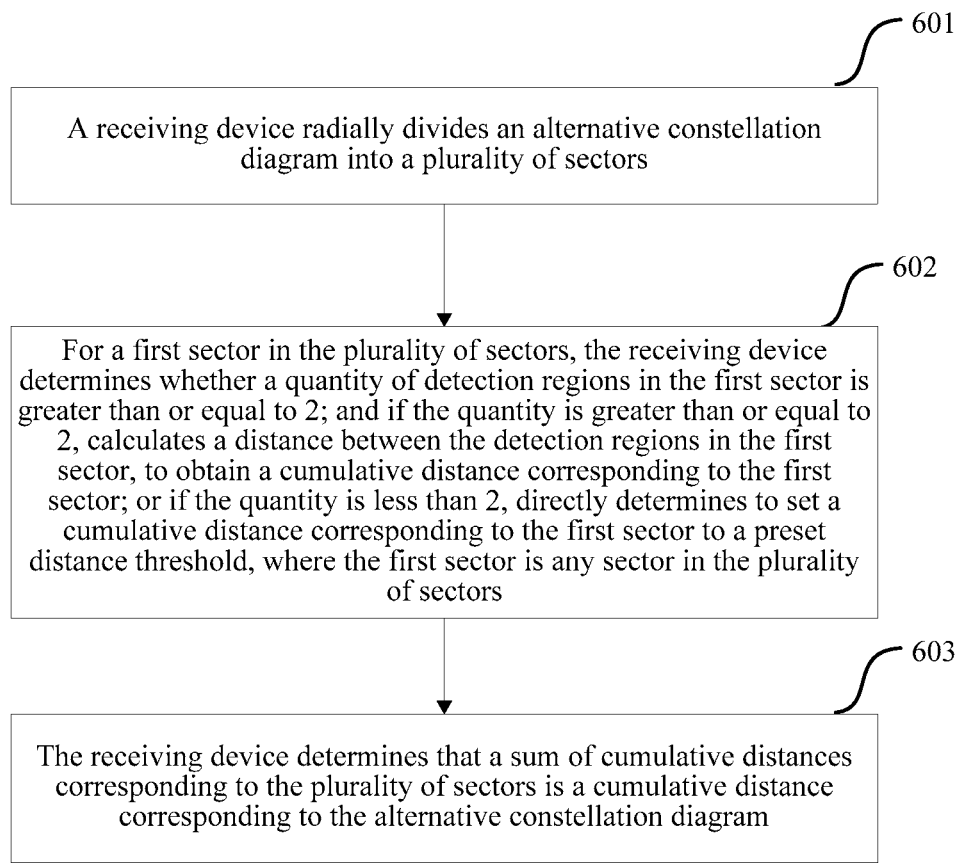
FIG. 6 is a schematic flowchart of determining a cumulative distance corresponding to an alternative constellation diagram according to an embodiment of this application.

FIG. 6 is a schematic flowchart of determining the cumulative distance corresponding to the alternative constellation diagram according to an embodiment of this application. Specific descriptions are provided below with reference to FIG. 6. As shown in FIG. 6, the procedure includes the following steps.

Step 601. The receiving device radially divides the alternative constellation diagram into a plurality of sectors. An arc length of each sector should be less than a preset arc length threshold. That is, the arc lengths of the sectors should be as sufficiently small as possible. The preset arc length threshold may be set by persons skilled in the art based on experience.

Step 602. For a first sector in the plurality of sectors, the receiving device determines whether a quantity of detection regions in the first sector is greater than or equal to 2; and if the quantity is greater than or equal to 2, calculates a distance between the detection regions in the first sector, to obtain a cumulative distance corresponding to the first sector; or if the quantity is less than 2, directly determines to set a cumulative distance corresponding to the first sector to a preset distance threshold, where the first sector is any sector in the plurality of sectors. The preset distance threshold may be set by persons skilled in the art based on experience and an actual situation.

Figure 4E:
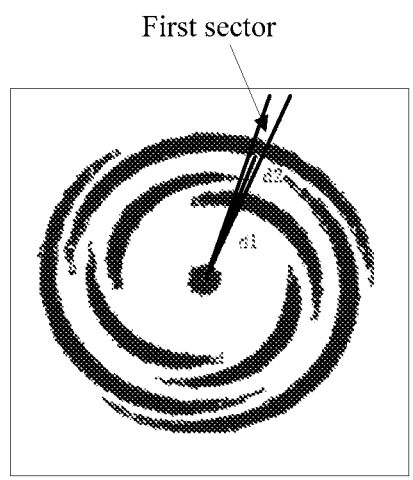
FIG. 4e is a schematic diagram of calculating a cumulative distance corresponding to a first sector.

FIG. 4e is a schematic diagram of calculating the cumulative distance corresponding to the first sector. As shown in FIG. 4e, if the quantity of detection regions in the first sector is 3, the cumulative distance corresponding to the first sector is a length sum of d1 and d2 in FIG. 4e.

Step 603. The receiving device determines that a sum of cumulative distances corresponding to the plurality of sectors is the cumulative distance corresponding to the alternative constellation diagram.

In this embodiment of this application, the receiving device divides the alternative constellation diagram into the plurality of sectors, and calculates the cumulative distances corresponding to the sectors, to obtain the cumulative distance corresponding to the alternative constellation diagram. In such a division manner, the calculated cumulative distance corresponding to the alternative constellation diagram has relatively high accuracy, and can better reflect the distance between the detection regions of the constellation points in the alternative constellation diagram.

After the receiving device may determine the cumulative distances of the alternative constellation diagrams in the alternative constellation diagram set in the foregoing manner, in step 402, the receiving device determines, based on the cumulative distances corresponding to the alternative constellation diagrams in the alternative constellation diagram set, that an alternative constellation diagram with a largest cumulative distance is the target constellation diagram.

In this embodiment of this application, after determining the cumulative distance of the alternative constellation diagram, the receiving device may determine whether the alternative constellation diagram is the last alternative constellation diagram in the alternative constellation diagram set; and if the alternative constellation diagram is not the last alternative constellation diagram in the alternative constellation diagram set, continue to calculate the cumulative distance of a next alternative constellation diagram; or if the alternative constellation diagram is the last alternative constellation diagram in the alternative constellation diagram set, compare the cumulative distances of the alternative constellation diagrams in the alternative constellation diagram set, and determine the alternative constellation diagram with the largest cumulative distance as the target constellation diagram. There may be a plurality of manners of determining, by the receiving device, whether the alternative constellation diagram is the last alternative constellation diagram. For example, the sending device may notify the receiving device of a quantity of the alternative constellation diagrams in the alternative constellation diagram set in advance, and the receiving device determines, based on a quantity of processed alternative constellation diagrams, whether the alternative constellation diagram is the last alternative constellation diagram.

After determining the target constellation diagram, the receiving device sends a notification message to the sending device, where the notification message is used to notify the sending device of the target constellation diagram, so that the sending device modulates to-be-sent data by using the target constellation diagram. Specifically, the notification message may carry the target constellation diagram, that is, the receiving device directly sends the target constellation diagram to the sending device. Alternatively, the notification message may carry identification information of the target constellation diagram, that is, the receiving device sends the identification information of the determined target constellation diagram to the sending device. This is not specifically limited in this embodiment of this application.

In step 403 and step 404, the receiving device receives the data, namely, a symbol point, sent by the sending device, and determines, based on a position of the symbol point in the target constellation diagram and the detection regions of the constellation points in the target constellation diagram, a detection region in which the symbol point is located. The detection region in the target constellation diagram is determined by the receiving device based on the training data in the process of determining the target constellation diagram.

In step 405, the receiving device maps the data into a bit based on the constellation point corresponding to the detection region in which the data is located, thereby completing demodulation of the data.

Further, if determining that the data is not in the detection regions of the constellation points in the target constellation diagram, the receiving device may determine a constellation point with a smallest distance from the position of the data based on the position of the data in the target constellation diagram; and demodulate the data based on the constellation point with the smallest distance from the position of the data.

Specifically, as shown in FIG. 4d, the detection regions of the constellation points in the target constellation diagram are helical-shaped, the data received by the receiving device may be in the detection region of the constellation point, or may be outside the detection region of the constellation point. To implement accurate detection on all received data, in this embodiment of this application, data in the detection region of the constellation point is detected based on the detection regions of the constellation points. For data not in the detection regions of the constellation points, a constellation point with a small distance from a position of the data may be determined based on the position of the data in the target constellation diagram, so that the data is demodulated based on the constellation point. Optionally, for the data not in the detection regions of the constellation points, the data may be detected in another manner in this embodiment of this application. This is not specifically limited.

Based on the foregoing content, in this embodiment of this application, the first detector in FIG. 2 is configured to detect the data in the detection region of the constellation point, and the second detector is configured to detect the data not in the detection regions of the constellation points, thereby implementing complete and accurate detection on all the received data.

In the foregoing embodiment of this application, the receiving device receives the training data that is generated and sent by the sending device based on each constellation point in the alternative constellation diagram; the receiving device determines the detection region of the constellation point based on the position of the training data corresponding to the constellation point in the alternative constellation diagram; the receiving device obtains the cumulative distance corresponding to the alternative constellation diagram based on the distance between the detection regions of the constellation points; the receiving device determines, based on the cumulative distances corresponding to the plurality of alternative constellation diagrams, the alternative constellation diagram with the largest cumulative distance as the target constellation diagram, and sends the notification message to the sending device, where the notification message is used to notify the sending device of the target constellation diagram, so that the sending device modulates the to-be-sent data based on the target constellation diagram. In this embodiment of this application, the training data received by the receiving device can accurately reflect a signal distribution status under impact of a highly nonlinear effect. Therefore, the detection region of the constellation point in the alternative constellation diagram that is determined based on the training data is more accurate and conforms to an actual situation. In addition, the cumulative distance corresponding to the alternative constellation diagram is obtained based on the distance between the detection regions of the constellation points in the alternative constellation diagram. The distance between the detection regions fully reflects a centralized distribution status of data received by the receiving device after the data is sent by using the alternative constellation diagram. More centralized distribution of the received data indicates a larger distance between the detection regions and better data transmission performance. Therefore, in this embodiment of this application, the target constellation diagram is determined based on the cumulative distance that can accurately reflect the distance between the detection regions of the constellation points in the alternative constellation diagram, and the data is sent by using the determined target constellation diagram, so that the data transmission performance can be effectively improved in the highly nonlinear effect.

For the foregoing method procedures, embodiments of this application further provide a sending device and a receiving device. For specific content of the sending device and the receiving device, refer to the foregoing method for implementation.

Figure 7:
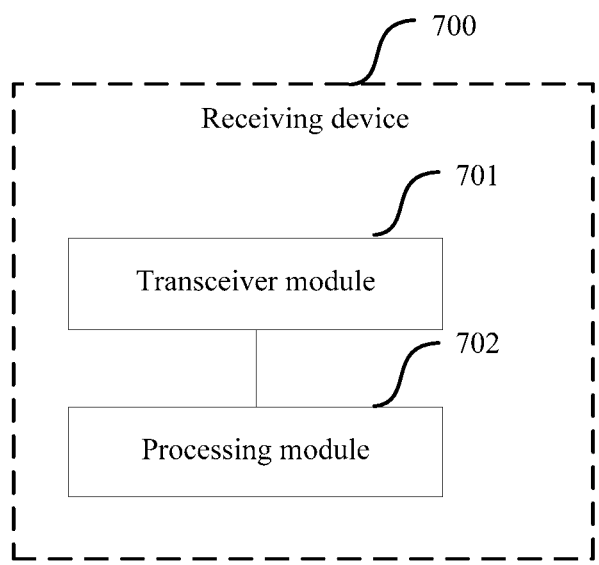
FIG. 7 is a schematic structural diagram of a receiving device according to Embodiment 2 of this application.

Based on a same concept, FIG. 7 is a schematic structural diagram of a receiving device according to Embodiment 2 of this application. As shown in FIG. 7, the receiving device 700 includes a transceiver module 701 and a processing module 702.

The transceiver module 701 is configured to receive training data that is generated and sent by a sending device based on each of a plurality of alternative constellation diagrams in an alternative constellation diagram set.

The processing module 702 is configured to: for the received training data that is generated and sent by the sending device based on each of the plurality of alternative constellation diagrams in the alternative constellation diagram set, determine a detection region of each constellation point in the alternative constellation diagram based on a position of the training data in the alternative constellation diagram; obtain a cumulative distance corresponding to the alternative constellation diagram based on a distance between the detection regions of the constellation points; and after obtaining cumulative distances corresponding to the alternative constellation diagrams in the alternative constellation diagram set, determine that an alternative constellation diagram with a largest cumulative distance is a target constellation diagram, and send a notification message to the sending device by using the transceiver module 701, where the notification message is used to notify the sending device of the target constellation diagram, so that the sending device modulates to-be-sent data based on the target constellation diagram.

Optionally, the processing module 702 is specifically configured to determine the detection region of a first constellation point in the alternative constellation diagram in the following manner, and the first constellation point is any constellation point in the alternative constellation diagram:

after receiving training data that corresponds to the first constellation point and that is sent by the sending device, performing de-noising processing on the training data, to obtain valid training data; and determining, based on a position of the valid training data in the alternative constellation diagram, that a region that can fully cover the valid training data and that has a smallest area is the detection region of the first constellation point.

Optionally, the processing module 702 is specifically configured to:

perform clustering processing on the received training data by using a preset clustering algorithm; and remove, as noise, training data that cannot be clustered, to obtain the valid training data.

Optionally, the processing module 702 is specifically configured to:

determine a smallest deflection angle and a largest deflection angle of the valid training data in the alternative constellation diagram;

divide a section between the smallest deflection angle and the largest deflection angle into a plurality of angle sections;

determine first training data with a smallest distance from a center of the alternative constellation diagram and second training data with a largest distance from the center of the alternative constellation diagram in each angle interval;

determine that an arc in which the first training data of each angle section is located is an inner boundary corresponding to the first constellation point, and that an arc in which the second training data of each angle section is located is an outer boundary corresponding to the first constellation point; and determine that a region enclosed by the inner boundary and the outer boundary is the detection region of the first constellation point.

Optionally, the processing module 702 is specifically configured to:

radially divide the alternative constellation diagram into a plurality of sectors;

determine, for a first sector in the plurality of sectors, whether a quantity of detection regions in the first sector is greater than or equal to 2; and if the quantity is greater than or equal to 2, calculate a distance between the detection regions in the first sector, to obtain a cumulative distance corresponding to the first sector; or if the quantity is less than 2, directly determine to set a cumulative distance corresponding to the first sector to a preset distance threshold, where the first sector is any sector in the plurality of sectors; and determine that a sum of cumulative distances corresponding to the plurality of sectors is the cumulative distance corresponding to the alternative constellation diagram.

Optionally, the transceiver module 701 is further configured to receive data sent by the sending device, where the data is obtained after the sending device modulates the to-be-sent data based on the target constellation diagram.

The processing module 702 is further configured to: determine, based on a position of the received data in the target constellation diagram and the detection regions of the constellation points in the target constellation diagram, a detection region in which the data is located; and demodulate the data based on a constellation point corresponding to the detection region in which the data is located.

Optionally, the processing module 702 is further configured to: if determining that the data is not in the detection regions of the constellation points in the target constellation diagram, determine a constellation point with a smallest distance from the position of the data based on the position of the data in the target constellation diagram; and demodulate the data based on the constellation point with the smallest distance from the position of the data.

Figure 8:
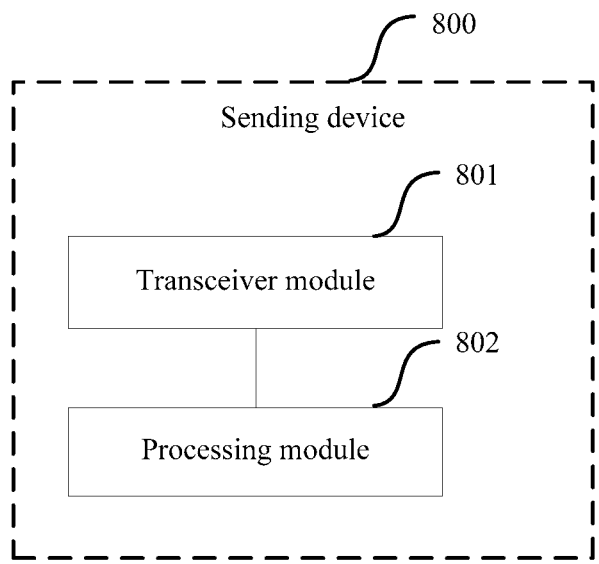
FIG. 8 is a schematic structural diagram of a sending device according to Embodiment 3 of this application.

Based on a same concept, FIG. 8 is a schematic structural diagram of a sending device according to Embodiment 3 of this application. As shown in FIG. 8, the sending device 800 includes a transceiver module 801 and a processing module 802.

The processing module 802 is configured to: generate training data based on a plurality of alternative constellation diagrams in an alternative constellation diagram set, and send the training data to a receiving device, so that the receiving device determines a target constellation diagram in the plurality of alternative constellation diagrams based on the training data of the plurality of alternative constellation diagrams.

The transceiver module 801 is configured to receive a notification message sent by the receiving device, where the notification message is used to notify the sending device of the target constellation diagram.

The processing module 802 is further configured to: modulate the to-be-sent data based on the target constellation diagram, and send the data to the receiving device by using the transceiver module 801.

Optionally, the processing module 802 is specifically configured to:
generate training data for any constellation point in any alternative constellation diagram; and
separately send training data generated for different constellation points in any alternative constellation diagram to the receiving device by using the transceiver module at preset intervals.

Figure 9:
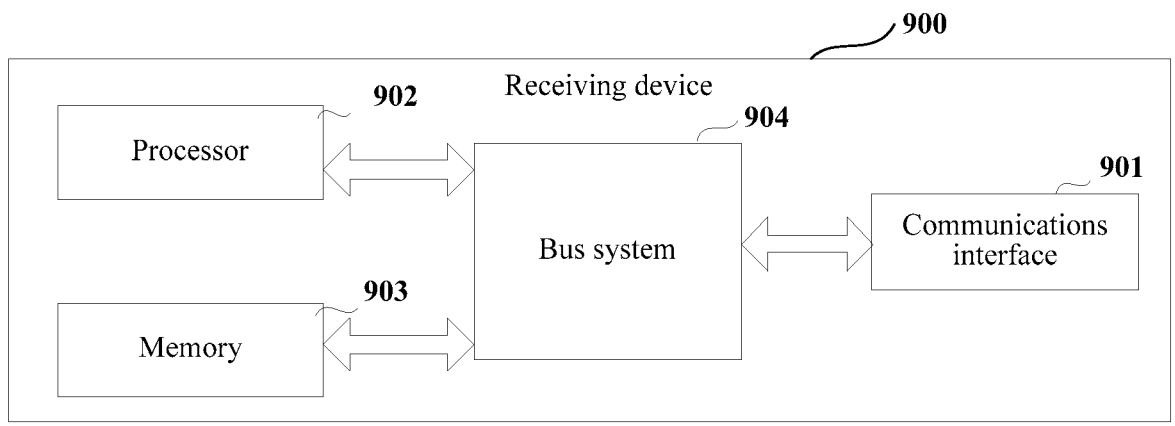
FIG. 9 is a schematic structural diagram of a receiving device according to Embodiment 4 of this application.

Based on a same concept, FIG. 9 is a schematic structural diagram of a receiving device according to Embodiment 4 of this application. As shown in FIG. 9, the receiving device 900 includes a communications interface 901, a processor 902, a memory 903, and a bus system 904.

The memory 903 is configured to store a program. Specifically, the program may include program code, and the program code includes a computer operation instruction. The memory 903 may be a random access memory (random access memory, RAM for short), or may be a non-volatile memory (non-volatile memory), such as at least one disk memory. Only one memory is shown in the figure. Certainly, a plurality of memories may alternatively be set as required. The memory 903 may alternatively be a memory in the processor 902.

The memory 903 stores the following elements, executable modules or data structures, or a subset thereof, or an extension set thereof:
operation instructions, including various operation instructions and used to perform various operations; and
an operating system, including various system programs and used to implement various basic services and process a hardware-based task.

The processor 902 controls an operation of the receiving device 900. The processor 902 may also be referred to as a CPU (Central Processing Unit, central processing unit). In a specific application, the components of the receiving device 900 are coupled together by using the bus system 904. In addition to a data bus, the bus system 904 may further include a power bus, a control bus, a status signal bus, and the like. However, for clear description, various types of buses in the figure are marked as the bus system 904. For convenience of presentation, the bus system 904 is merely schematically drawn in FIG. 9.

The method disclosed in the foregoing embodiments of this application may be applied to the processor 902, or may be implemented by using the processor 902. The processor 902 may be an integrated circuit chip and has a signal processing capability. In an implementation process, steps in the foregoing methods can be implemented by using a hardware integrated logical circuit in the processor 902, or by using an instruction in a form of software. The foregoing processor 902 may be a general purpose processor, a digital signal processor (DSP), an application-specific integrated circuit (ASIC), a field programmable gate array (FPGA) or another programmable logic device, a discrete gate, a transistor logic device, or a discrete hardware component. The processor 902 may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly implemented by using a hardware decoding processor, or may be implemented by using a combination of hardware and software modules in the decoding processor. The software module may be located in a mature storage medium in the art, such as a random access memory, a flash memory, a read-only memory, a programmable read-only memory, an electrically erasable programmable memory, a register, or the like. The storage medium is located in the memory 903. The processor 902 reads information in the memory 903 and performs the following steps in combination with hardware of the processor:
receiving, by using the communications interface 901, training data that is generated and sent by a sending device based on each of a plurality of alternative constellation diagrams in an alternative constellation diagram set; and
for the received training data that is generated and sent by the sending device based on each of the plurality of alternative constellation diagrams in the alternative constellation diagram set, determining a detection region of each constellation point in the alternative constellation diagram based on a position of the training data in the alternative constellation diagram; and obtaining a cumulative distance corresponding to the alternative constellation diagram based on a distance between the detection regions of the constellation points; and after obtaining cumulative distances corresponding to the alternative constellation diagrams in the alternative constellation diagram set, determining that an alternative constellation diagram with a largest cumulative distance is a target constellation diagram, and sending a notification message to the sending device by using the communications interface 901, where the notification message is used to notify the sending device of the target constellation diagram, so that the sending device modulates to-be-sent data based on the target constellation diagram.

Optionally, the processor 902 is specifically configured to determine the detection region of a first constellation point in the alternative constellation diagram in the following manner, and the first constellation point is any constellation point in the alternative constellation diagram:
after receiving training data that corresponds to the first constellation point and that is sent by the sending device, performing de-noising processing on the training data, to obtain valid training data; and
determining, based on a position of the valid training data in the alternative constellation diagram, that a region that can fully cover the valid training data and that has a smallest area is the detection region of the first constellation point.

Optionally, the processor 902 is specifically configured to:
perform clustering processing on the received training data by using a preset clustering algorithm; and
remove, as noise, training data that cannot be clustered, to obtain the valid training data.

Optionally, the processor 902 is specifically configured to:
determine a smallest deflection angle and a largest deflection angle of the valid training data in the alternative constellation diagram;
divide a section between the smallest deflection angle and the largest deflection angle into a plurality of angle sections;
determine first training data with a smallest distance from a center of the alternative constellation diagram and second training data with a largest distance from the center of the alternative constellation diagram in each angle interval;
determine that an arc in which the first training data of each angle section is located is an inner boundary corresponding to the first constellation point, and that an arc in which the second training data of each angle section is located is an outer boundary corresponding to the first constellation point; and
determine that a region enclosed by the inner boundary and the outer boundary is the detection region of the first constellation point.

Optionally, the processor 902 is specifically configured to:
radially divide the alternative constellation diagram into a plurality of sectors;
determine, for a first sector in the plurality of sectors, whether a quantity of detection regions in the first sector is greater than or equal to 2; and if the quantity is greater than or equal to 2, calculate a distance between the detection regions in the first sector, to obtain a cumulative distance corresponding to the first sector; or if the quantity is less than 2, directly determine to set a cumulative distance corresponding to the first sector to a preset distance threshold, where the first sector is any sector in the plurality of sectors; and
determine that a sum of cumulative distances corresponding to the plurality of sectors is the cumulative distance corresponding to the alternative constellation diagram.

Optionally, the communications interface 901 is further configured to receive data sent by the sending device, where the data is obtained after the sending device modulates the to-be-sent data based on the target constellation diagram; and
the processor 902 is further configured to: determine, based on a position of the received data in the target constellation diagram and the detection regions of the constellation points in the target constellation diagram, a detection region in which the data is located; and demodulate the data based on a constellation point corresponding to the detection region in which the data is located.

Optionally, the processor 902 is further configured to: if determining that the data is not in the detection regions of the constellation points in the target constellation diagram, determine a constellation point with a smallest distance from the position of the data based on the position of the data in the target constellation diagram; and demodulate the data based on the constellation point with the smallest distance from the position of the data.

Figure 10:
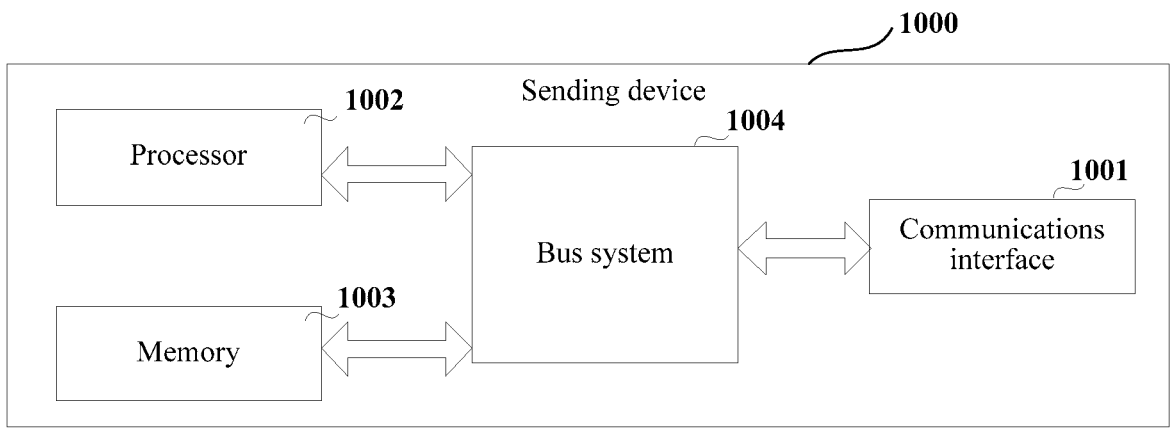
FIG. 10 is a schematic structural diagram of a sending device according to Embodiment 5 of this application.

Based on a same concept, FIG. 10 is a schematic structural diagram of a sending device according to Embodiment 5 of this application. As shown in FIG. 10, the sending device 1000 includes a communications interface 1001, a processor 1002, a memory 1003, and a bus system 1004.

The memory 1003 is configured to store a program. Specifically, the program may include program code, and the program code includes a computer operation instruction. The memory 1003 may be a random access memory (random access memory, RAM for short), or may be a non-volatile memory (non-volatile memory), such as at least one disk memory. Only one memory is shown in the figure. Certainly, a plurality of memories may alternatively be set as required. The memory 1003 may alternatively be a memory in the processor 1002.

The memory 1003 stores the following elements, executable modules or data structures, or a subset thereof, or an extension set thereof:
operation instructions, including various operation instructions and used to perform various operations; and
an operating system, including various system programs and used to implement various basic services and process a hardware-based task.

The processor 1002 controls an operation of the sending device 1000. The processor 1002 may also be referred to as a CPU (Central Processing Unit, central processing unit). In a specific application, the components of the sending device 1000 are coupled together by using the bus system 1004. In addition to a data bus, the bus system 1004 may further include a power bus, a control bus, a status signal bus, and the like. However, for clear description, various types of buses in the figure are marked as the bus system 1004. For convenience of presentation, the bus system 1004 is merely schematically drawn in FIG. 10.

The method disclosed in the foregoing embodiments of this application may be applied to the processor 1002, or may be implemented by using the processor 1002. The processor 1002 may be an integrated circuit chip and has a signal processing capability. In an implementation process, steps in the foregoing methods can be implemented by using a hardware integrated logical circuit in the processor 1002, or by using an instruction in a form of software. The foregoing processor 1002 may be a general purpose processor, a digital signal processor (DSP), an application-specific integrated circuit (ASIC), a field programmable gate array (FPGA) or another programmable logic device, a discrete gate, a transistor logic device, or a discrete hardware component. The processor 1002 may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly implemented by using a hardware decoding processor, or may be implemented by using a combination of hardware and software modules in the decoding processor. The software module may be located in a mature storage medium in the art, such as a random access memory, a flash memory, a read-only memory, a programmable read-only memory, an electrically erasable programmable memory, a register, or the like. The storage medium is located in the memory 1003. The processor 1002 reads information in the memory 1003 and performs the following steps in combination with hardware of the processor:
generating training data based on a plurality of alternative constellation diagrams in an alternative constellation diagram set, and sending the training data to a receiving device by using the communications interface 1001, so that the receiving device determines a target constellation diagram in the plurality of alternative constellation diagrams based on the training data of the plurality of alternative constellation diagrams;

receiving, by using the communications interface 1001, a notification message sent by the receiving device, where the notification message is used to notify the sending device of the target constellation diagram; and modulating the to-be-sent data based on the target constellation diagram, and send the data to the receiving device by using the communications interface 1001.

Optionally, the processor 1002 is specifically configured to:

generate training data for any constellation point in any alternative constellation diagram; and separately send training data generated for different constellation points in any alternative constellation diagram to the receiving device by using the communications interface at preset intervals.

It can be learned from the foregoing content that:

In the embodiments of this application, the receiving device receives the training data that is generated and sent by the sending device based on each constellation point in the alternative constellation diagram; the receiving device determines the detection region of the constellation point based on the position of the training data corresponding to the constellation point in the alternative constellation diagram; the receiving device obtains the cumulative distance corresponding to the alternative constellation diagram based on the distance between the detection regions of the constellation points; the receiving device determines, based on the cumulative distances corresponding to the plurality of alternative constellation diagrams, the alternative constellation diagram with the largest cumulative distance as the target constellation diagram, and sends the notification message to the sending device, where the notification message is used to notify the sending device of the target constellation diagram, so that the sending device modulates the to-be-sent data based on the target constellation diagram. In the embodiments of this application, the training data received by the receiving device can accurately reflect a signal distribution status under impact of a highly nonlinear effect. Therefore, the detection region of the constellation point in the alternative constellation diagram that is determined based on the training data is more accurate and conforms to an actual situation. In addition, the cumulative distance corresponding to the alternative constellation diagram is obtained based on the distance between the detection regions of the constellation points in the alternative constellation diagram. The distance between the detection regions fully reflects a centralized distribution status of data received by the receiving device after the data is sent by using the alternative constellation diagram. More centralized distribution of the received data indicates a larger distance between the detection regions and better data transmission performance. Therefore, in this embodiment of this application, the target constellation diagram is determined based on the cumulative distance that can accurately reflect the distance between the detection regions of the constellation points in the alternative constellation diagram, and the data is sent by using the determined target constellation diagram, so that the data transmission performance can be effectively improved in the highly nonlinear effect.

Persons skilled in the art should understand that the embodiments of this application may be provided as a method, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided to a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more procedures in the flowcharts and/or in one or more blocks in the block diagrams.

These computer program instructions may be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A target constellation diagram determining method, comprising:

determining, by a receiving device for received training data that is generated and sent by a sending device based on each alternative constellation diagram in an alternative constellation diagram set, a detection region of each of a plurality of constellation points in the alternative constellation diagram based on a position of the training data in the alternative constellation diagram;

obtaining a cumulative distance corresponding to the alternative constellation diagram based on a distance between the detection regions of the plurality of constellation points, wherein obtaining the cumulative distance corresponding to the alternative constellation diagram based the distance between the detection regions of the constellation points in the alternative constellation diagram comprises:

radially dividing, by the receiving device, the alternative constellation diagram into a plurality of sectors;

determining, by the receiving device for a first sector in the plurality of sectors, whether a quantity of detection regions in the first sector is greater than or equal to 2;

if the quantity is greater than or equal to 2, calculating a distance between the detection regions in the first sector, to obtain a cumulative distance corresponding to the first sector;

if the quantity is less than 2, directly determining to set a cumulative distance corresponding to the first sector to a preset distance threshold, wherein the first sector is any sector in the plurality of sectors; and determining, by the receiving device, that a sum of cumulative distances corresponding to the plurality of sectors is the cumulative distance corresponding to the alternative constellation diagram;

after obtaining the cumulative distance corresponding to each alternative constellation diagram in the alternative constellation diagram set, determining, by the receiving device, an alternative constellation diagram of the alternative constellation diagrams with a largest cumulative distance as a target constellation diagram, and sending a notification message to the sending device, wherein the notification message is configured for notifying the sending device of the target constellation diagram, so that the sending device modulates to-be-sent data based on the target constellation diagram.

2. The method according to claim 1, wherein the plurality of constellation points comprises a first constellation point, and wherein determining, by the receiving device, the detection region of the plurality of constellation points in the alternative constellation diagram comprises:

after receiving training data that corresponds to the first constellation point and that is sent by the sending device, performing, by the receiving device, de-noising processing on the training data, to obtain valid training data; and determining, by the receiving device based on a position of the valid training data in the alternative constellation diagram, a region to be the detection region of the first constellation point, wherein the determined region can fully cover the valid training data and has a smallest area.

3. The method according to claim 2, wherein performing, by the receiving device, the de-noising processing on the received training data, to obtain valid training data comprises:

performing, by the receiving device, clustering processing on the received training data by using a preset clustering algorithm; and removing, as noise, by the receiving device, training data that cannot be clustered, to obtain the valid training data.

4. The method according to claim 2, wherein determining, by the receiving device, the region to be the detection region of the first constellation point comprises:

determining, by the receiving device, a smallest deflection angle and a largest deflection angle of the valid training data in the alternative constellation diagram;

dividing, by the receiving device, a section between the smallest deflection angle and the largest deflection angle into a plurality of angle sections;

determining, by the receiving device, first training data with a smallest distance from a center of the alternative constellation diagram and second training data with a largest distance from the center of the alternative constellation diagram in each angle interval;

determining, by the receiving device, that an arc in which the first training data in each angle section is located is an inner boundary corresponding to the first constellation point, and that an arc in which the second training data in each angle section is located is an outer boundary corresponding to the first constellation point; and determining, by the receiving device, that a region enclosed by the inner boundary and the outer boundary is the detection region of the first constellation point.

5. The method according to claim 1, wherein after the sending, by the receiving device, the notification message to the sending device, the method further comprises:

receiving, by the receiving device, data sent by the sending device, wherein the data is obtained after the sending device modulates the to-be-sent data based on the target constellation diagram;

determining, by the receiving device based on a position of the received data in the target constellation diagram and the detection regions of the constellation points in the target constellation diagram, a detection region in which the data is located; and demodulating, by the receiving device, the data based on a constellation point corresponding to the detection region in which the data is located.

6. The method according to claim 5, wherein the method further comprises:

if the data is determined not in the detection regions of the constellation points in the target constellation diagram, determining, by the receiving device, a constellation point with a smallest distance from the position of data based on the position of the data in the target constellation diagram; and demodulating, by the receiving device, the data based on the constellation point with the smallest distance from the position of the data.

7. A receiving device, comprising a communications interface and a processor, wherein the communications interface is configured to receive training data that is generated and sent by a sending device based on each of a plurality of alternative constellation diagrams in an alternative constellation diagram set; and the processor is configured to:

for the received training data that is generated and sent by the sending device based on each alternative constellation diagram in the alternative constellation diagram set, determine a detection region of each of a plurality of constellation points in the alternative constellation diagram based on a position of the training data in the alternative constellation diagram;

obtain a cumulative distance corresponding to the alternative constellation diagram based on a distance between the detection regions of the plurality of constellation points wherein obtaining the cumulative distance corresponding to the alternative constellation diagram based on the distance between the detection regions of the constellation points in the alternative constellation diagram comprises:

radially dividing the alternative constellation diagram into a plurality of sectors;

determining, for a first sector in the plurality of sectors, whether a quantity of detection regions in the first sector is greater than or equal to 2;

if the quantity is greater than or equal to 2, calculate a distance between the detection regions in the first sector, to obtain a cumulative distance corresponding to the first sector;

if the quantity is less than 2, directly determine to set a cumulative distance corresponding to the first sector to a preset distance threshold, wherein the first sector is any sector in the plurality of sectors; and determining that a sum of cumulative distances corresponding to the plurality of sectors is the cumulative distance corresponding to the alternative constellation diagram;

after obtaining the cumulative distance corresponding to each alternative constellation diagrams in the alternative constellation diagram set, determine an alternative constellation diagram of the plurality of alternative constellation diagrams with a largest cumulative distance as a target constellation diagram, and send a notification message to the sending device by using the communications interface, wherein the notification message is configured for notifying the sending device of the target constellation diagram, so that the sending device modulates to-be-sent data based on the target constellation diagram.

8. The receiving device according to claim 7, wherein the plurality of constellation points comprises a first constellation point, and wherein determining the detection region of the plurality of constellation point in the alternative constellation diagram comprises:

after receiving training data that corresponds to the first constellation point and that is sent by the sending device, performing de-noising processing on the training data, to obtain valid training data; and determining, based on a position of the valid training data in the alternative constellation diagram, a region to be the detection region of the first constellation point, wherein the determined region can fully cover the valid training data and has a smallest area.

9. The receiving device according to claim 8, wherein the processor is configured to:

perform clustering processing on the received training data by using a preset clustering algorithm; and remove, as noise, training data that cannot be clustered, to obtain the valid training data.

10. The receiving device according to claim 8, wherein the processor is configured to:

determine a smallest deflection angle and a largest deflection angle of the valid training data in the alternative constellation diagram;

divide a section between the smallest deflection angle and the largest deflection angle into a plurality of angle sections;

determine first training data with a smallest distance from a center of the alternative constellation diagram and second training data with a largest distance from the center of the alternative constellation diagram in each angle interval;

determine that an arc in which the first training data in each angle section is located is an inner boundary corresponding to the first constellation point, and that an arc in which the second training data in each angle section is located is an outer boundary corresponding to the first constellation point; and determine that a region enclosed by the inner boundary and the outer boundary is the detection region of the first constellation point.

11. The receiving device according to claim 7, wherein the communications interface is further configured to receive data sent by the sending device, and the data is obtained after the sending device modulates the to-be-sent data based on the target constellation diagram; and the processor is further configured to:

determine, based on a position of the received data in the target constellation diagram and the detection regions of the constellation points in the target constellation diagram, a detection region in which the data is located; and demodulate the data based on a constellation point corresponding to the detection region in which the data is located.

12. The receiving device according to claim 11, wherein the processor is further configured to: if the data is determined not in the detection regions of the constellation points in the target constellation diagram, determine a constellation point with a smallest distance from the position of the data based on the position of the data in the target constellation diagram; and demodulate the data based on the constellation point with the smallest distance from the position of the data.

* * * * *